United States Patent [19]

Austermann, Jr. et al.

[11] 4,192,396
[45] Mar. 11, 1980

[54] VEHICLE AXLE INCLUDING ENDWAYS OPENING AXLE END

[75] Inventors: John F. Austermann, Jr., Berkley; Jerome E. Pack, Canton Township, Barron County, both of Mich.

[73] Assignee: Lear Siegler, Inc., Detroit, Mich.

[21] Appl. No.: 810,448

[22] Filed: Jun. 27, 1977

Related U.S. Application Data

[63] Continuation-in-part of Ser. No. 779,377, Mar. 21, 1977, abandoned.

[51] Int. Cl.² .................... B60K 17/22; B60K 17/30; B60B 35/00
[52] U.S. Cl. ................... 180/252; 280/663; 280/691; 301/127; 301/132
[58] Field of Search ............ 301/124 R, 132–133, 301/127; 280/663–666, 668, 690–691, 698–701, 96.1; 180/73 R, 43 R; 72/367, 356

[56] References Cited

U.S. PATENT DOCUMENTS

| 807,832 | 12/1905 | Lindsay | 301/124 R X |
|---|---|---|---|
| 1,819,579 | 8/1931 | Whitcomb | 280/670 |
| 2,097,362 | 10/1937 | Best | 280/95 R |
| 2,152,660 | 4/1939 | Paton | 280/95 R |
| 2,911,262 | 11/1959 | Franck | 301/123 R |
| 2,942,893 | 6/1960 | Nallinger | 280/701 |
| 3,144,259 | 8/1964 | De Haan | 280/96.1 |
| 3,804,467 | 4/1974 | Austermann | 301/127 |
| 3,806,151 | 4/1974 | Prasniewski | 280/701 |

FOREIGN PATENT DOCUMENTS 214317 7/1941 Switzerland ............ 280/690

Primary Examiner—Charles A. Marmor
Attorney, Agent, or Firm—Reising, Ethington, Barnard, Perry & Brooks

[57] ABSTRACT

A unitary axle of an elongated tubular construction preferably made from heat treated steel so as to be light weight with high strength. Two embodiments of the axle each have a first vehicle mounted end and a second wheel supporting end as well as an intermediate portion having an I-beam section whose combined height and width is less than the combined height and width of the intermediate axle portion adjacent the second axle end. Upper, lower, and spaced side walls of the intermediate axle portion have a uniform thickness and the side walls are deformed inwardly to form the I-beam section preferably so as to have inner sides thereof engaged with each other. First and second bends in the axle adjacent the first and second ends thereof allow it to be used in an overlapping relationship with another bent axle. A rectangular section of the intermediate axle portion is located between the I-beam section and the second axle end. Third and fourth embodiments of the axle like the first two each have a wheel supporting end that opens endways with respect to the axle.

24 Claims, 30 Drawing Figures

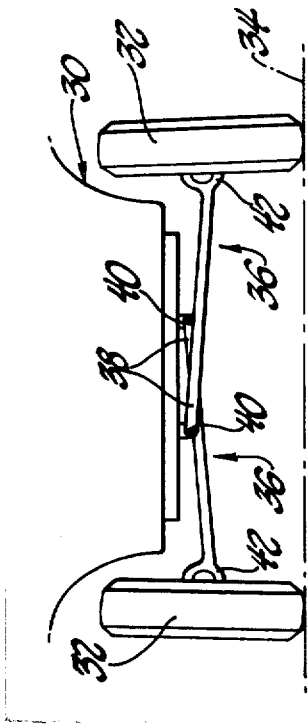
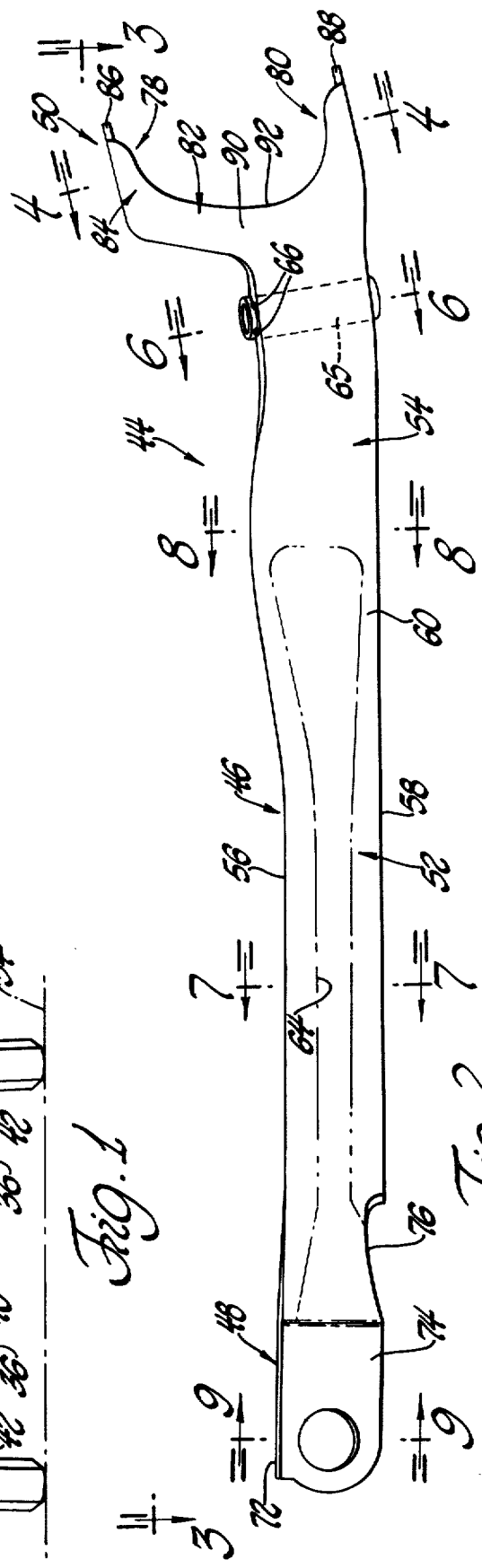
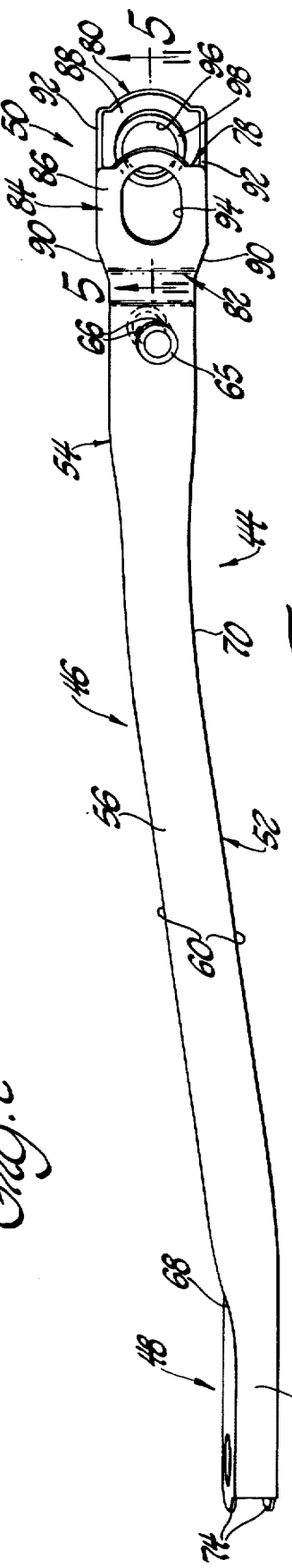

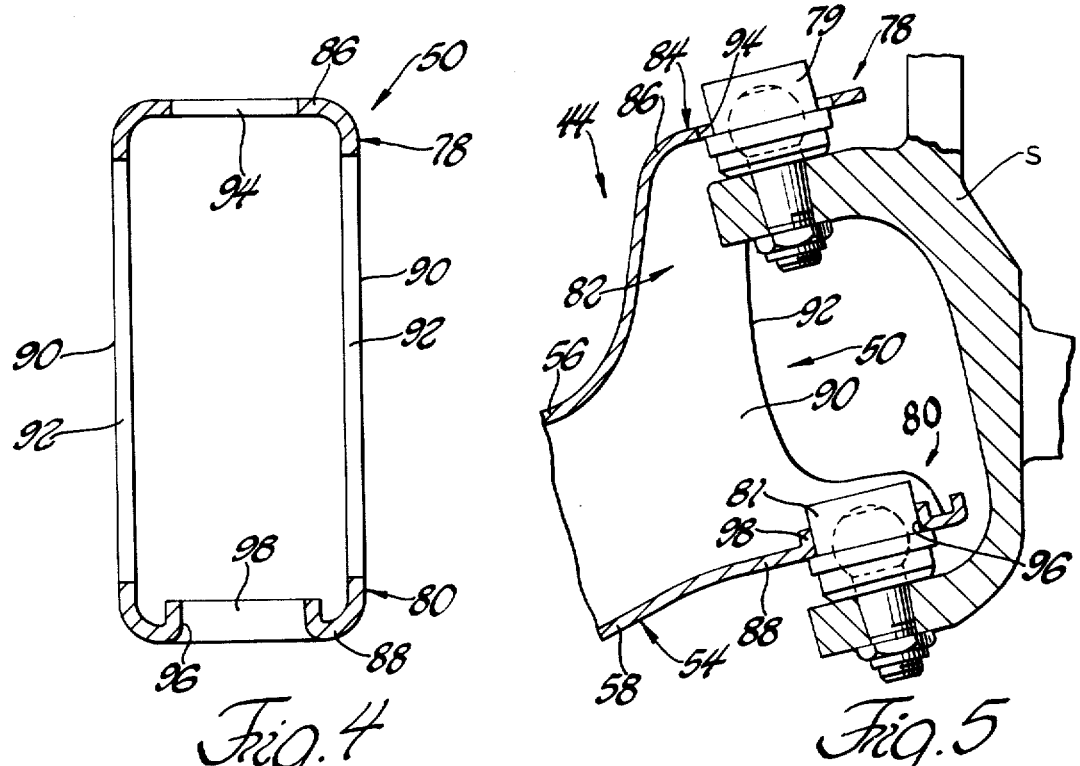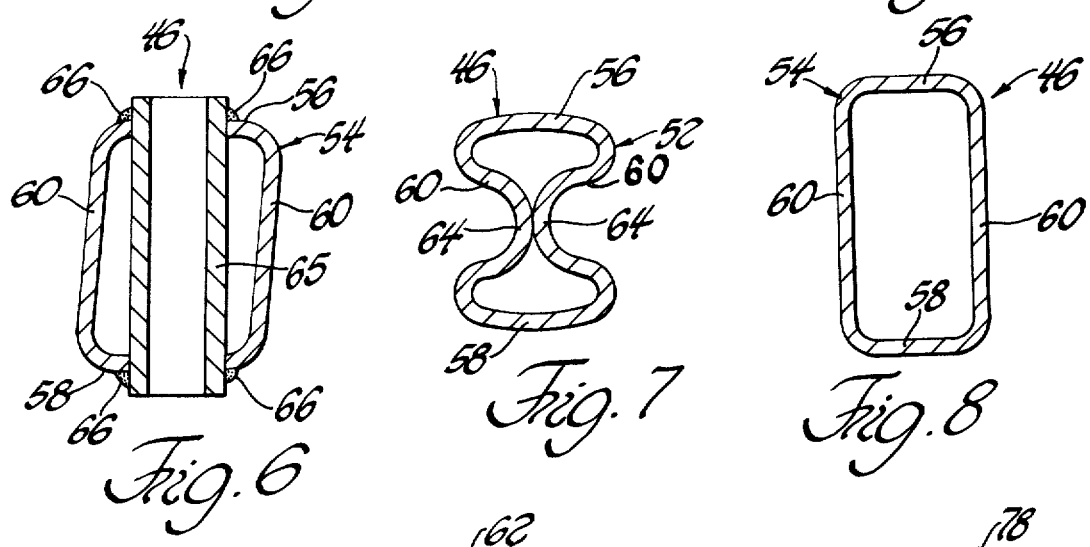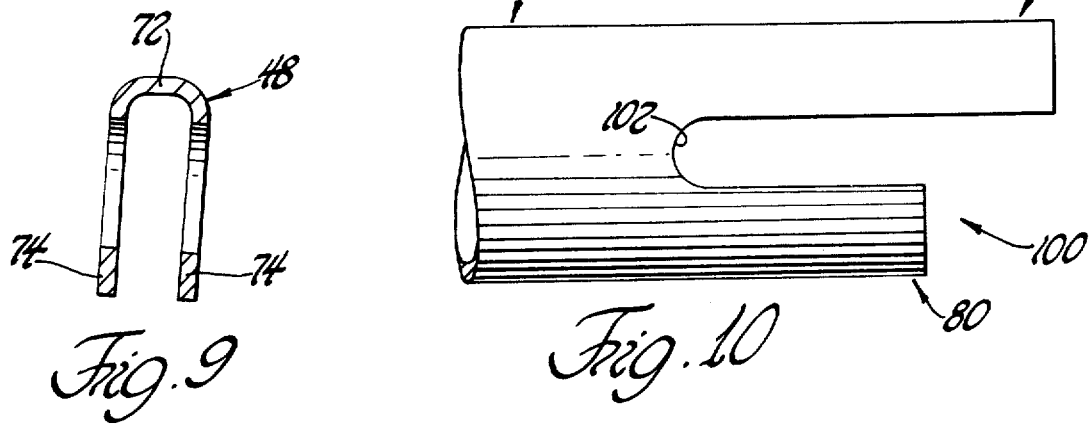

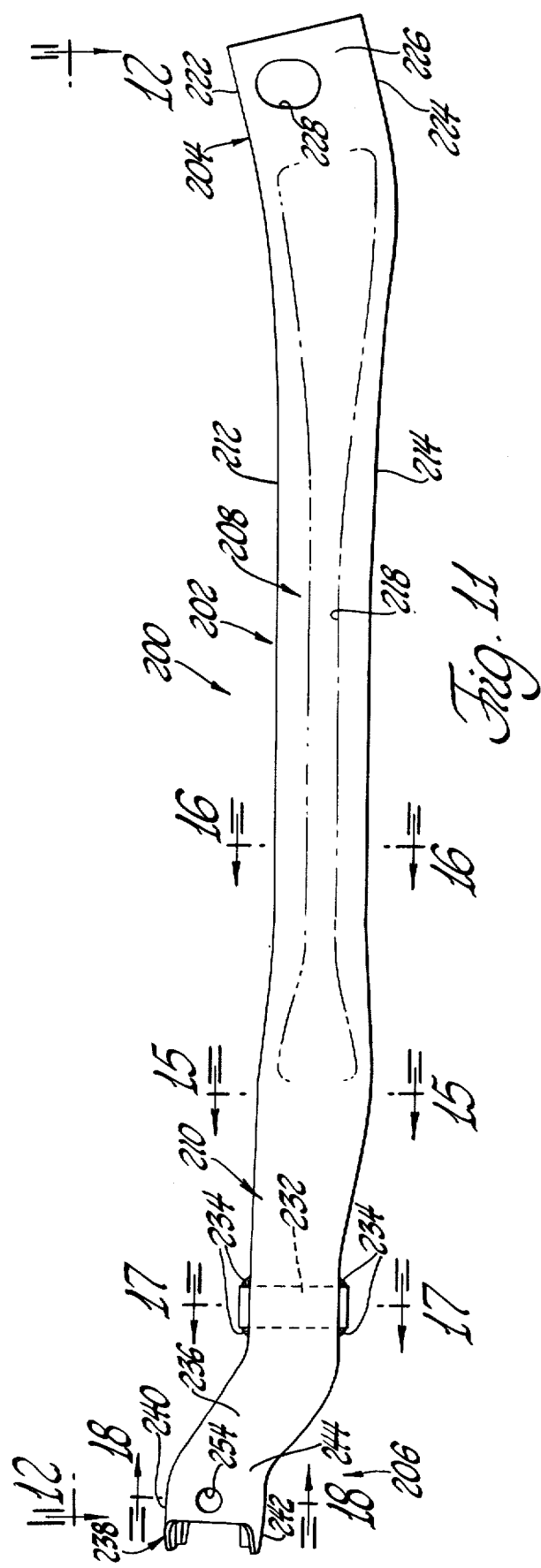
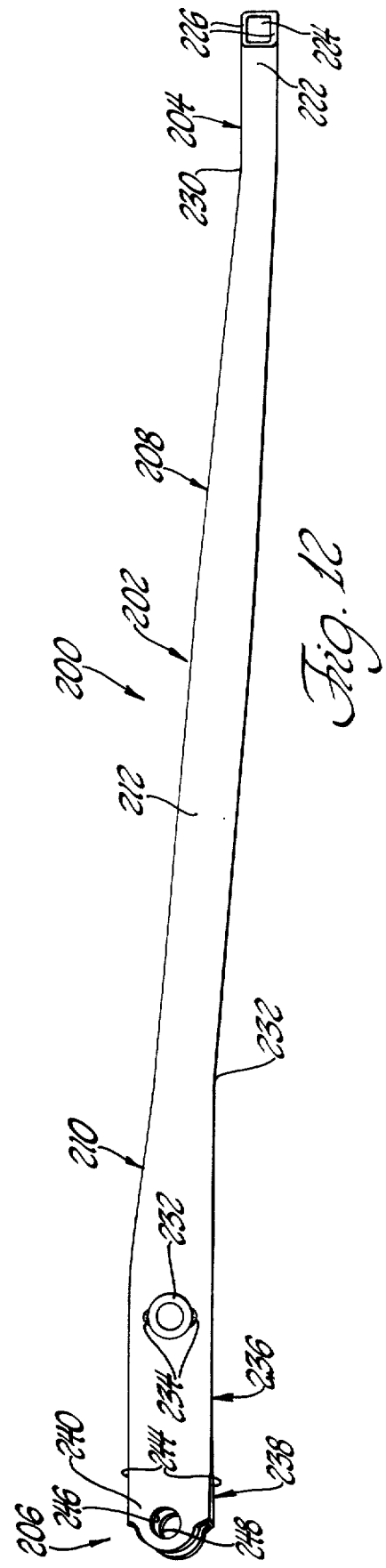

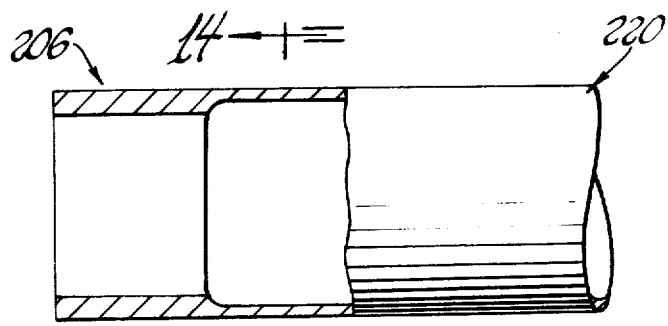
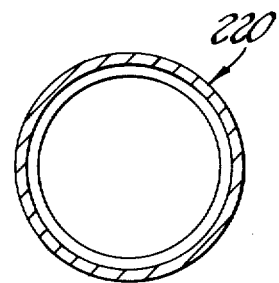
Fig. 13  Fig. 14
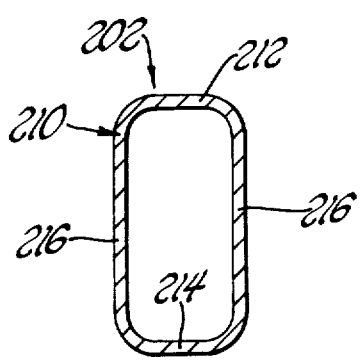
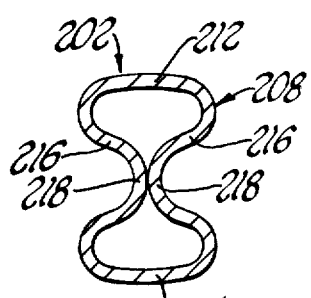
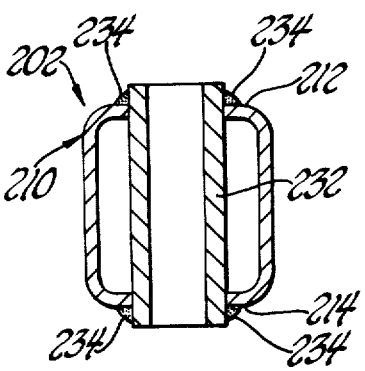
Fig. 15  Fig. 16  Fig. 17
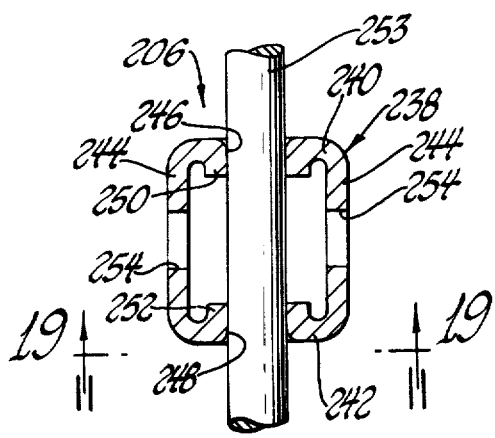
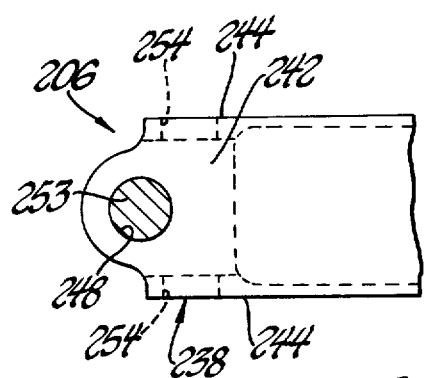
Fig. 18  Fig. 19

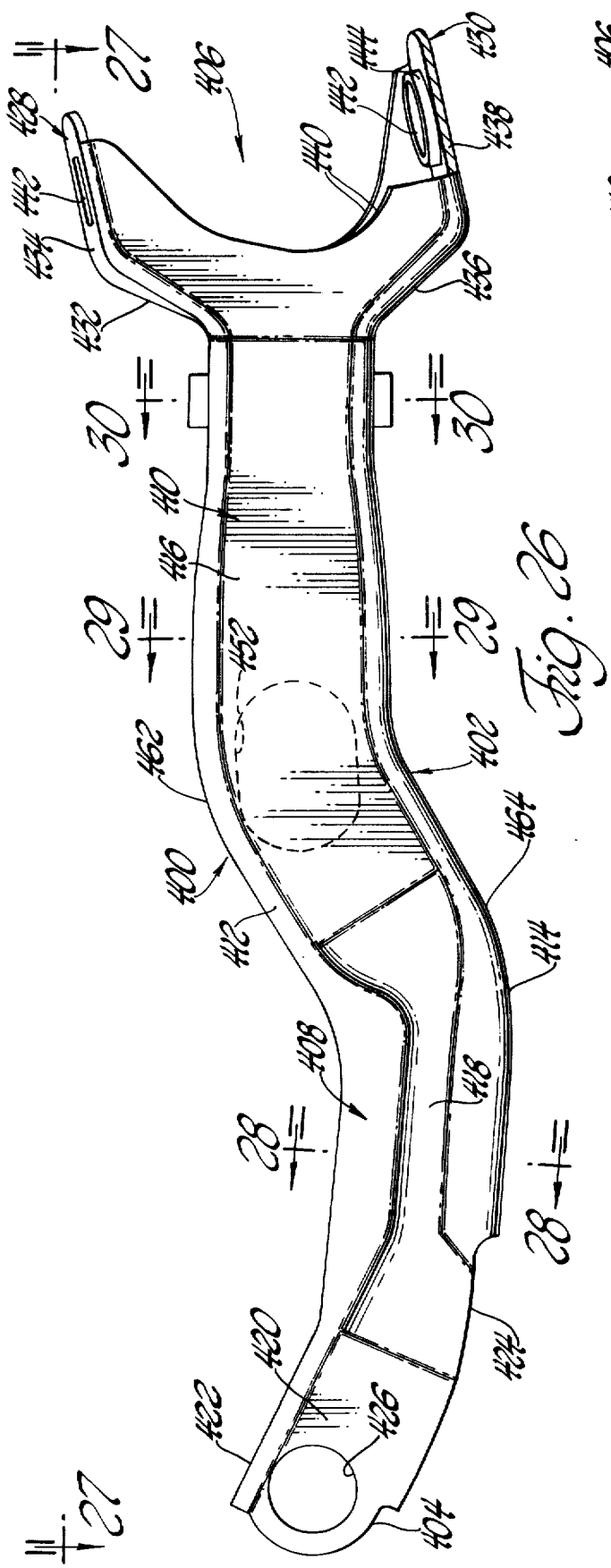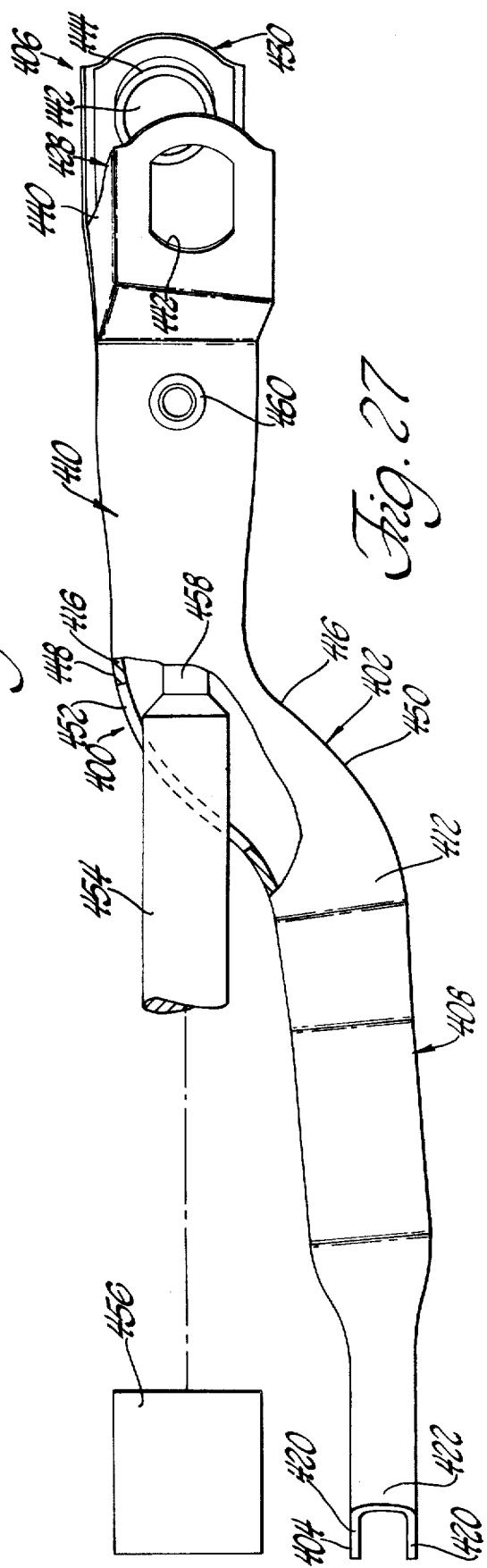

4,192,396

VEHICLE AXLE INCLUDING ENDWAYS OPENING AXLE END

This application is a continuation-in-part of now abandoned application Ser. No. 779,377, filed Mar. 21, 1977 and assigned to the assignee of the present application, and the entire disclosure of this prior application is hereby incorporated by reference.

BACKGROUND OF THE INVENTION

1. Field of the Invention

This invention relates to a unitary axle of an elongated tubular construction.

2. Description of the Prior Art

Axles for vehicles have previously been manufactured from tubular blanks with ends that are formed so as to be capable of supporting associated wheels. One type of axle end supports a king pin used to pivotally mount a wheel spindle about an axis around which the wheel is turned. Another type of axle is made from a two piece construction including upper and lower members that are stamped and welded to each other with associated projections thereof at an end of the axle provided for mounting ball joints that support the wheel spindle. This latter type of axle has a bifurcated end shape where stress concentration can occur at the welds between the two members.

In manufacturing vehicle axles from tubular blanks of a uniform wall thickness, sometimes the combined height and width of the axle required for strength at certain locations is greater than the combined height and width that can be utilized at other locations without interference between the axle and other vehicle components during axle movement.

Of course, axles have also been made of a solid construction in addition to hollow axles that are made from either a tubular or two piece construction as described above. Solid axles are usually made by a forging process and necessarily have a smaller strength to weight ratio than hollow axles since more material of the axle is located adjacent the neutral axes of twisting and bending than is the case with hollow axles.

Front vehicle axles have previously incorporated overlapping inner ends connected to the associated vehicle. This overlapping relationship allows the axle to have a greater length than is possible when the inner axle ends do not overlap. Less curvature is present in the arc of wheel movement at the outer axle end during axle movement due to this increased length.

U.S. Pat. Nos. relating to axles are as follows: 2,007,793; 2,053,975; 2,124,406; 2,752,673; and 3,804,467.

SUMMARY OF THE INVENTION

An object of the present invention is to provide a unitary axle of an elongated tubular construction having an intermediate portion extending between a first vehicle mounted end and a second wheel supporting end and including upper, lower, and side walls of a uniform thickness with the side walls deformed inwardly to provide an I-beam section at a location spaced toward the first axle end from the second axle end so that the axle has a combined height and width at the I-beam section which is less than the combined height and width of the axle adjacent the second axle end.

Another object of the invention is to provide a unitary axle of an elongated tubular construction including an intermediate axle portion of a uniform wall thickness and a wheel supporting axle end of a bifurcated shape having upper and lower projections and webbed side walls extending therebetween, one of the projections having a vertically bent support section and an end section extending from the support section, and the webbed side walls extending between the projections with a wall thickness at least as great as the intermediate axle portion wall thickness.

In carrying out the above objects, two preferred embodiments of the axle have relatively straight shapes incorporating the intermediate axle portion with the I-beam section. One embodiment has its wheel supporting end provided with the bifurcated shape defined by the upper and lower projections which are utilized to support a wheel spindle by upper and lower ball joints. The other embodiment has its wheel supporting end provided with mounting openings for mounting a king pin utilized to support a wheel spindle. Bends are provided in the intermediate axle portion of both embodiments so that each axle can be utilized in an overlapping relationship with another bent axle to support an associated vehicle on a pair of wheels. A rectangular section of the intermediate axle portion is located between the I-beam section and the wheel supporting end in both of the embodiments of the axle. At the I-beam section of each of these axles, the combined height and width of the axle is less than the combined height and width thereof at the rectangular section.

The axle embodiment with the I-beam section and the bifurcated end has its webbed side walls oriented in an outwardly opening direction. Upper and lower walls of the projections provide continuations of the upper and lower walls on the intermediate axle portion and have mounting openings utilized in securing the upper and lower ball joints to the projections. Each webbed side wall has a smoothly curved edge extending between the projections and spaced further from each other than the intermediate axle portion side walls due to the outwardly opening orientation of the webbed side walls. The upper and lower walls of the projections and the webbed side walls are axially upset so that their wall thickness is at least as great as the wall thickness of the intermediate axle portion. Preferably, the upper projection includes the vertically bent section which extends upwardly and the end section which extends generally parallel to the lower projection. Side walls of the other axle end having mounting openings therein utilized to pivotally mount the axle on an associated vehicle.

The other preferred embodiment of the axle with the I-beam section has its wheel supporting end axially upset to include end walls that are thicker than the wall thickness of its intermediate axle portion. This axle end has upper, lower, and side walls formed with a rectangular shape that provides a continuation of the rectangular section along the intermediate axle portion between the I-beam section thereof and the thickened walls. Mounting holes used in mounting a king pin for supporting a wheel extend through each thickened upper, lower, and side wall of the axle end. Flanges are provided on the mounting openings of the upper and lower walls projecting inwardly with respect to the interior of the axle cross section. On the opposite side of the I-beam section along the intermediate axle portion from the wheel supporting end, the axle has a flattened end which is provided to an associated vehicle. Upper, lower and side walls of this flattened axle end provide continuations of the intermediate axle portion walls with mounting openings being provided in the side walls to pivot the axle to the vehicle.

A third preferred embodiment of a tubular unitary axle is disclosed as having an intermediate axle portion that is mounted to an associated vehicle so that each of its ends can be formed with the bifurcated shape utilized to mount a wheel spindle by upper and lower ball joints. Between the axle ends, the intermediate axle portion has a rectangular section with upper, lower, and spaced side walls of a uniform wall thickness. At each axle end, the webbed side walls thereof are axially upset so as to have a thickness at least as great as, and preferably greater than, the thickness of the intermediate axle portion walls. Each projection has a vertically bent section and an end section projection therefrom parallel to the end section of the other projection.

A fourth axle embodiment has I-beam and rectangular sections like the first two embodiments but is bent abruptly and apertured to receive a drive shaft so it can be used as a front wheel drive axle. Upper, lower and side walls of both the I-beam and rectangular sections have a uniform wall thickness like the other two axle embodiments. Inward deformations of the side walls along the I-beam section provide it with a combined height and width that is less than the height and width of the rectangular section. A first end of the axle on one side of the I-beam section is pivotally supported on an associated vehicle while a second end of the axle supports a wheel adjacent the rectangular section. Upper and lower projections of the wheel supporting axle end each have a support section bent vertically and an end section extending outwardly from the associated support section. Webbed side walls extend between the projections and have a wall thickness at least as great as the wall thickness of the intermediate axle portion along the I-beam and rectangular sections. A pair of abrupt horizontal bends of opposite curvature along the rectangular section and a pair of abrupt vertical bends therealong provide the axle with a curved shape that facilitates its use as a front wheel axle. At the abrupt horizontal bend closest to the wheel supporting axle end, an aperture in the rectangular section side wall is provided so that the drive shaft can be received within the axle to provide the driving of the supported wheel.

The objects, features and advantages of the present invention are readily apparent from the following detailed description of the preferred embodiment taken in connection with the accompanying drawings.

BRIEF DESCRIPTION OF THE DRAWINGS

FIG. 1 is a schematic environmental view taken transversely through a vehicle to illustrate one way in which axles of the present invention can be utilized;

FIG. 2 is a side elevation view of one preferred embodiment of an axle constructed according to the present invention;

FIG. 3 is a top plan view of the axle taken along line 3—3 of FIG. 2;

FIG. 4 is a sectional view of the axle taken along line 4—4 of FIG. 2;

FIG. 5 is a sectional view of the axle taken along line 5—5 of FIG. 3 with upper and lower ball joints mounted thereon to show the manner in which a wheel spindle is supported by the axle;

FIGS. 6, 7, 8, and 9 are sectional views of the axle respectively taken along lines 6—6, 7—7, 8—8, and 9—9 of FIG. 2;

FIG. 10 is a side view of an axle blank end utilized to form the angle shown in FIGS. 2-9;

FIG. 11 is a side elevation view showing another preferred embodiment of an axle constructed according to the present invention;

FIG. 12 is a top plan view of the axle taken along line 12—12 of FIG. 11;

FIG. 13 is a partially sectioned view of an axle blank end that is formed to provide the axle of FIGS. 11 and 12;

FIG. 14 is a cross sectional view of the axle blank taken along line 14—14 of FIG. 13;

FIGS. 15, 16, 17, and 18 are sectional views of the axle taken respectively along lines 15—15, 16—16, 17—17, and 18—18 of FIG. 11;

FIG. 19 is a bottom plan view of the axle end taken along line 19—19 of FIG. 18;

FIG. 26 is a side elevation view showing a further preferred embodiment of an axle constructed according to the present invention;

FIG. 27 is a top plan view of the axle taken along line 27—27 of FIG. 26 and showing a schematically indicated front wheel drive differential and a portion of an associated drive shaft driven by the differential and received within the axle;

DETAILED DESCRIPTION OF THE PREFERRED EMBODIMENTS

Figure 20:
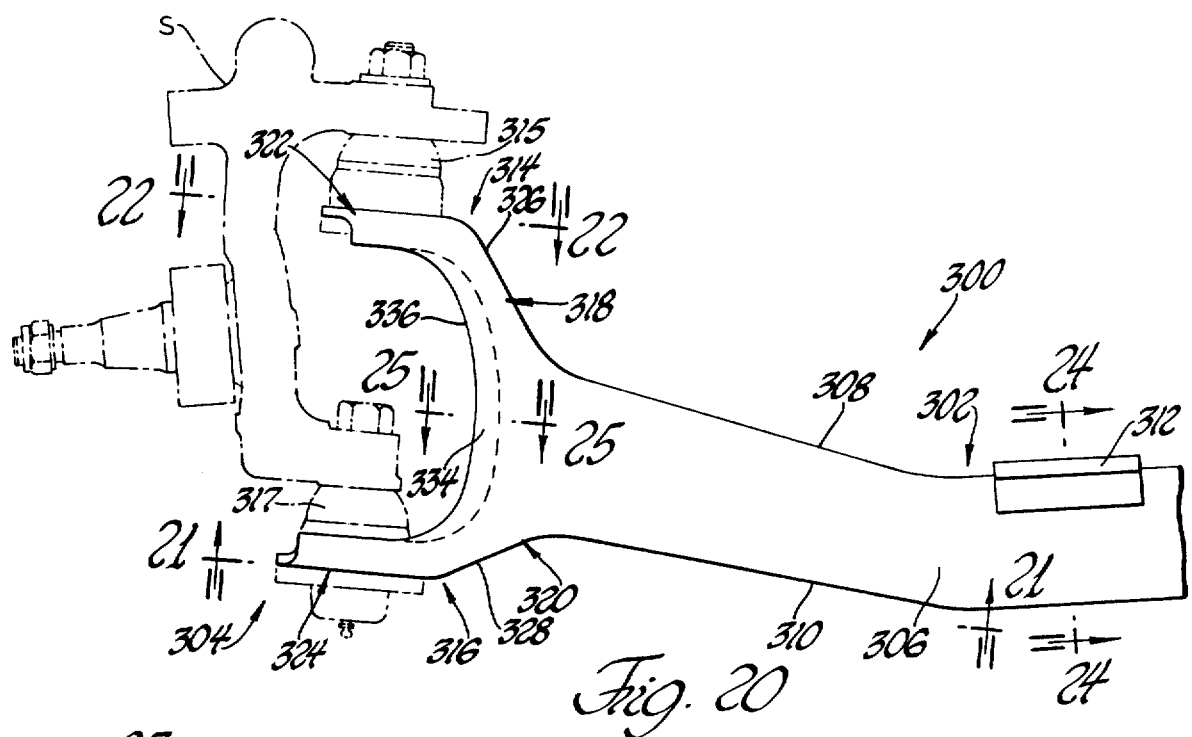
FIG. 20 is a partial side elevation view showing another preferred embodiment of an axle constructed according to the present invention.

FIG. 1 shows one manner in which axles constructed according to the present invention can be utilized with a vehicle 30 to support wheels 32 engaged with the ground 34 over which the vehicle travels. Each axle is indicated by numeral 36 and has a first inner end 38 pivotally secured to the vehicle by an associated bushing supported pin 40 as well as a second outer end 42 that supports the associated wheel. Inner axle ends 38 overlap each other so that the axles have an increased length which allows the curvature of upward and downward wheel movement to be less than is possible without this overlapping relationship of the axles. Shock absorbers dampened arms are biased by springs (none of these components being shown) and extend between the vehicle and the axles intermediate their ends to control upward and downward axle movement during wheel suspension jounce.

Referring to FIGS. 2 and 3, one preferred embodiment of a unitary axle made with an elongated tubular construction according to the present invention is indicated generally by 44. An intermediate axle portion 46 of axle 44 extends between a first end 48 that is adapted to be mounted on an associated vehicle and a second end 50 that is designed to support an associated wheel. Intermediate axle portion 46 has an I-beam section 52 adjacent the first axle end 48 and a rectangular section 54 adjacent the second axle end 50.

As seen by additional reference to FIGS. 7 and 8, intermediate axle portion 46 has horizontally extending upper and lower walls 56 and 58 as well as vertically extending spaced side walls 60 that connect the upper and lower walls along both the I-beam section 52 and the rectangular section 54. Axle 44 is made from a tubular blank 62 (FIG. 10) of an elongated shape that is formed by rolling and then edge welding a seam of the blank to provide its enclosed hollow construction. Die forming of the blank initially forms the intermediate portion 46 of the axle with the rectangular section 54 shown in FIG. 8 and the end 50 of FIG. 2. Subsequent die forming of the intermediate axle portion forms inward deformations 64 along the I-beam section 52 as shown in FIGS. 2 and 7. These deformations decrease the combined height of the I-beam axle section along its side walls 60 and width along its upper and lower walls 56 and 58 as compared to the combined height and width of the axle at its rectangular section 54. This construction enables the axle to be utilized with vehicles having particular underbody constructions without interference between the axle I-beam section 52 and the associated vehicle during axle movement and while still having the required size of the rectangular axle section 54 necessary to support the associated vehicle wheel by the axle end 50. Deformations 64 are preferably formed inwardly with smoothly curved shaped sufficiently far so that their curved inner sides engage each other as shown in FIG. 7 and thereby provide structural support between the side walls 60 in addition to the support therebetween provided by the upper and lower walls 56 and 58.

At the rectangular section 54 of the intermediate axle portion just adjacent the wheel supporting axle end 50 as shown in FIGS. 2, 3, and 6, a tubular sleeve 65 extends between the upper and lower walls 56 and 58 which are slightly skewed with respect to the side walls 60 at this location. Welds 66 secure upper and lower ends of sleeve 65 to walls 56 and 58 as best seen in FIG. 6 so that the sleeve is fixed with respect to the axle. During mounting on a vehicle, the interior of the sleeve 64 receives a connecting pin which attaches to one end of a connecting arm whose other end is secured to the vehicle. A spring and a shock absorber extend between the connecting arm and the vehicle so as to thereby control suspension jounce during vehicle travel over a roadway.

As seen in FIG. 3, intermediate axle portion 46 has a first bend 68 adjacent the first axle end 48 and a second reverse bend 70 generally adjacent the second axle end 50 so that the axle has a somewhat S shape when viewed in the top plan direction. This bent configuration of the axle allows it to be utilized with another bent axle and to have the inner ends of the axles overlapped in the manner shown by FIG. 1. As previously mentioned, the overlapped axle relationship allows an increased axle length that lessens the curvature of wheel movement during suspension jounce.

The first axle end 48 which is adapted to be secured to an associated vehicle is shown in FIGS. 2, 3 and 9 as having an upper wall 72 and side walls 74 that respectively form continuations of the intermediate axle portion upper wall 56 and side walls 60. A notch 76 (FIG. 2) is formed in each side wall 60 of the intermediate axle portion adjacent the first end 48 and the lower wall 58 thereof is cut away so that there is no lower wall at the first axle end in order to prevent interference of the axle with the particular vehicle with which the axle shown is adapted to be utilized. Thus, the vehicle mounted axle end has a downwardly opening U shape as shown in FIG. 9. However, when the axle is utilized with other vehicles it could also have a rectangular section with a lower wall connecting the side walls 74.

As seen in FIG. 5, the wheel supporting axle end 50 includes upper and lower projections 78 and 80 utilized to mount upper and lower ball joints 79 and 81, respectively, for supporting a wheel spindle S. Upper projection 78 has a vertically projecting support section 82 that is bent upwardly from the rectangular section 54 of the intermediate axle portion and also has an end section 84 that projects from the support section in a skewed relationship thereto but in a parallel relationship to the lower projection 80. Upper and lower walls 86 and 88 of projections 78 and 80, respectively, form continuations of the upper and lower walls 56 and 58 of the intermediate axle portion 46 at its rectangular section 54. Webbed side walls 90 of axle end 50 extend between the upper and lower projections 78 and 80 and extend away from each other (FIG. 3) in an outwardly opening direction so that the upper and lower walls 86 and 88 of the axle end have a greater width than the width of the rectangular section 54 of the intermediate axle portion 46. Each webbed side wall 90 of axle end 50 has a smoothly curved edge 92 which prevents stress concentration from occurring at the axle end during loading of the axle. Support section 82 of the upper projection 78 has the upper wall 86 therealong extending in a skewed relationship to the lower wall 88 of the lower projection 80 as best seen in FIG. 5. End section 84 of the upper projection 78 has the upper wall 86 therealong extending parallel to the lower wall 88 of the lower projection.

Ball joint mounting openings 94 and 96 are provided in the upper and lower walls 86 and 88, respectively, of the axle end projections for mounting ball joints 79 and 81 as shown in FIG. 5. A straight piercing process is utilized to form the upper mounting opening 94 and this opening has a somewhat elongated shape shown in FIG. 3 so as to permit the upper ball joint 79 supported therein to be adjustably positioned to control wheel camber angle. The lower mounting opening 96 as best seen in FIG. 4 has an annular flange 98 that is stamped upwardly from the lower wall 88 of the lower projection for use in mounting the lower ball joint.

The upper and lower axle projection walls 86 and 88 as well as the webbed side walls 90 are axially upset (from the right toward the left as viewed in FIGS. 2, 3, and 5) so that they have a wall thickness at least as great as the wall thickness of the intermediate axle portion 46. This structure allows the axle to be manufactured from thinner stock than would be possible if the axial upsetting were not performed. Also, a heat treated steel is preferably utilized to form the axle rather than a cold rolled steel stock in order to further permit reduction of the wall thickness necessary.

The end 100 of the axle blank 62 shown in FIG. 10 is first formed to include a pair of end notches 102 along its sides so as to define upper and lower projections 78 and 80 that are ultimately formed to provide the axle end projections shown in FIGS. 2 and 3. The lower projection 80 is cut off before the forming takes place so that both projections terminate at the same location despite the longer total length of the upper projection along its support and end sections 82 and 84.

Another embodiment of a unitary tubular axle constructed according to the present invention is indicated generally by 200 in FIGS. 11 and 12 and includes an intermediate axle portion 202 that extends between first and second axle ends 204 and 206. Intermediate axle portion 202 has an I-beam section 208 adjacent the first axle end 204 and a rectangular section 210 adjacent its second end 206. Axle end 204 is adjustable to mount the axle on an associated vehicle while the axle end 206 is designed to support a king pin used to mount a wheel spindle. Upper and lower walls 212 and 214 of the intermediate axle portion extend horizontally as shown in FIGS. 15 and 16 and are connected by vertically extending side walls 216. These intermediate axle portion walls have a uniform wall thickness. Inward deformations 218 formed in the side walls 216 along the I-beam section 208 give the axle a combined width along its upper and lower walls and height along its side walls less than the combined width and height of the axle at its rectangular section 210. This construction allows the axle to be utilized without interference at the I-beam section with certain vehicle underbody constructions while still having the required strength to support an associated wheel at the second axle end 206. Preferably, the deformations 218 are formed inwardly with smoothly curved shapes sufficiently far so that their inner sides engage each other as shown in FIG. 16. This engagement provides additional support between side walls 216 to the connection therebetween by upper and lower walls 212 and 214.

Axle 200 shown in FIGS. 11 and 12 is formed from a unitary axle blank 220 that is illustrated in FIGS. 13 and 14. Planar heat treated steel stock is rolled to the circular shape shown and then edge welded to form the circular blank. Subsequently, the blank end 206 is axially upset (from the left to the right as in FIG. 13) so that it has an end wall thickness approximately twice as great as the wall thickness of the rest of the axle. Forming of the axle is then performed to provide its intermediate portion 202 with the I-beam and rectangular sections 208 and 210 previously described.

The first axle end 204 shown in FIGS. 11 and 12 has upper and lower walls 222 and 224, FIG. 17, and side walls 226 that connect the upper and lower walls with a rectangular shape. These axle end walls form continuations of the intermediate axle portion walls. Mounting openings 228 in the side walls 226 are utilized to pivotally mount the axle end 204 on an associated vehicle in a manner previously described in connection with FIG. 1. In regard to this mounting, it should be noted that the intermediate axle portion 202 has first and second bends 230 and 232, FIG. 12, respectively adjacent its first and second ends 204 and 206 so that the axle has a somewhat S shape when viewed from below, i.e. and an inverse S shape when viewed from above as in this view. This S shape of the axle allows it to be utilized with another bent axle in an overlapping relationship so as to permit an increased axle length that lessens the degree of wheel travel curvature during suspension jounce. Adjacent the wheel supporting axle end 206, a sleeve 232 extends between the upper and lower intermediate axle portion walls 212 and 214 and is secured by welds 234 seen in FIG. 17. Sleeve 232 connects one end of a spring biased connecting arm whose other end is connected to the vehicle in order to control the suspension jounce of axle 200 in cooperation with a shock absorber that extends between the arm and the vehicle.

As seen in FIG. 11, axle end 206 has a neck 236 that is formed to extend upwardly from the rectangular section 210 adjacent sleeve 232 and an end section 238 connected to the neck. Upper and lower walls 240 and 242 of the axle end section 238 and side walls 244 thereof are formed with a rectangular cross section as seen in FIG. 18. Mounting openings 246 and 248 formed in the upper and lower walls 240 and 242, respectively, have inwardly formed flanges 250 and 252. A king pin 253 is received within the mounting opening flanges and functions to support a wheel spindle. Side walls 244 have pierced mounting openings 254 that are utilized to mount a king pin securing member that prevents upward and downward movement of the king pin. Of course, the king pin mounting openings 246 and 248 could also be straight pierced and receive a tube in which the king pin is received rather than being formed with the flanges 250 and 252.

Figure 21:
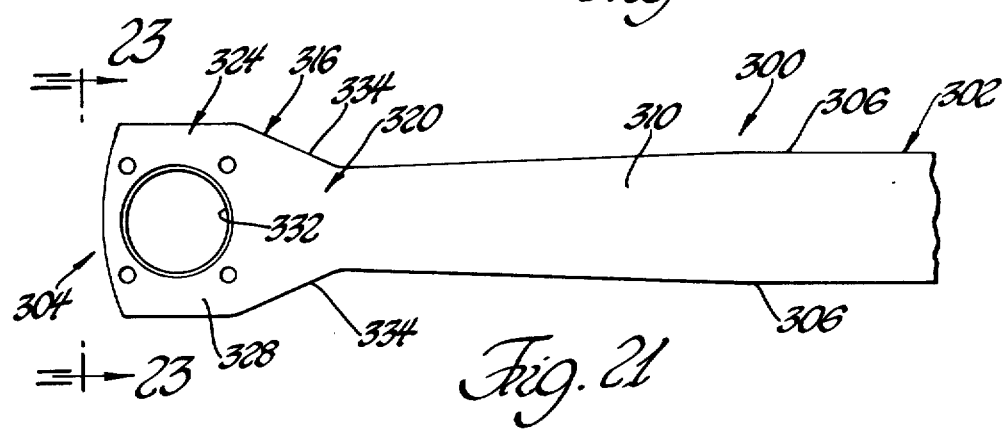
FIG. 21 is a bottom plan view of the axle taken along line 21—21 of FIG. 20.
Figure 24:
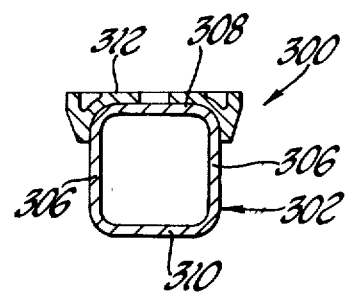
FIGS. 24 and 25 are sectional views of the axle taken along lines 24—24 and 25—25 of FIG. 20.

Referring to FIGS. 20 and 21, a third embodiment of a unitary tubular axle constructed according to the present invention is indicated generally by 300 and includes an intermediate axle portion 302 adaptable to be mounted on a vehicle as well as opposite ends 304 (only one shown) for supporting a wheel spindle S. Intermediate axle portion 302 has a rectangular cross section which is preferably square as shown in FIG. 24 consisting of spaced side walls 306 and upper and lower walls 308 and 310 connecting the side walls. A pair of attachment pads 312 (only one shown) are mounted on the intermediate axle portion 302 in any suitable manner so as to permit mounting of the axle on a vehicle underbody or to suspension components.

Figure 22:
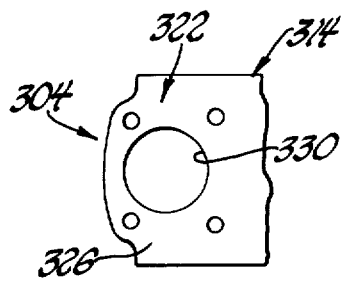
FIG. 22 is a partial top plan view of the axle taken along line 22—22 of FIG. 20.
Figure 23:
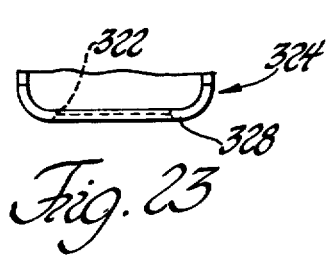
FIG. 23 is a partial end view of the axle taken along line 23—23 of FIG. 21.

Axle end 304 shown in FIGS. 20 and 21 is constructed from a tubular axle blank like the blank 100 shown in FIG. 10 and has a structure similar to the axle end 50 on the axle embodiment of FIGS. 1-9. Upper and lower projections 314 and 316 of axle end 304 respectively mount upper and lower ball joints 315 and 317 that support the wheel spindle S. Support sections 318 and 320 of the upper and lower projections are bent vertically so as to extend upwardly and downwardly from the intermediate axle portion 302. End sections 322 and 324 of the upper and lower projections project from the associated support sections 318 and 320 in a parallel relationship to each other and mount the upper and lower ball joints during use. Upper and lower walls 326 and 328 of the upper and lower projections provide continuations of the upper and lower intermediate axle portion walls 308 and 310. Ball joint mounting openings 330 (FIG. 22) and 332 (FIG. 21) in the upper and lower projection walls receive the ball joints during the mounting so as to permit securement thereof with respect to the axle end.

Figure 25:
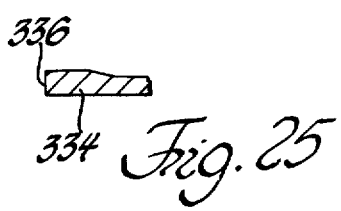

As seen in FIGS. 20, 21, and 25, webbed side walls 334 extend between the upper and lower projections 314 and 316 in a spaced relationship to each other with an outwardly opening orientation toward the left. Each webbed side wall has a smoothly curved edge 336 and these edges are spaced further from each other than the side walls 306 of the intermediate axle portion due to the outwardly opening configuration of the webbed side walls. An axial upsetting operation performed on the webbed side walls 334 from the left toward the right ensures that these walls will have a thickness at least as great as the other walls of the axle despite the upwardly and downwardly bent orientations of the support sections 318 and 320 which tend to stretch the webbed side walls and make them thinner. Preferably, the axial upsetting is performed sufficiently so that the webbed side walls 334 have a thickness of approximately twice the wall thickness as the other axle walls. This increased wall thickness and the smoothly curved edges 336 of the webbed side walls gives the axle end 304 a high strength construction with a minimum tendency to have any stress build up.

Referring to FIGS. 26 and 27, a further preferred embodiment of a unitary axle made from an elongated tubular construction in accordance with the present invention is indicated generally by 400. An intermediate axle portion 402 of the axle extends between its first end 404 which is adapted to be pivotally mounted on an associated vehicle and a second end 406 that is designed to support an associated wheel. Intermediate axle portion 402 has an I-beam section 408 adjacent the wheel mounted axle end and a rectangular section 410 adjacent the wheel supporting axle end. Much of the construction of this axle is similar to the axle shown and described in connection with FIGS. 1-10 and portions of this description are thus also applicable here as well.

Figure 28:
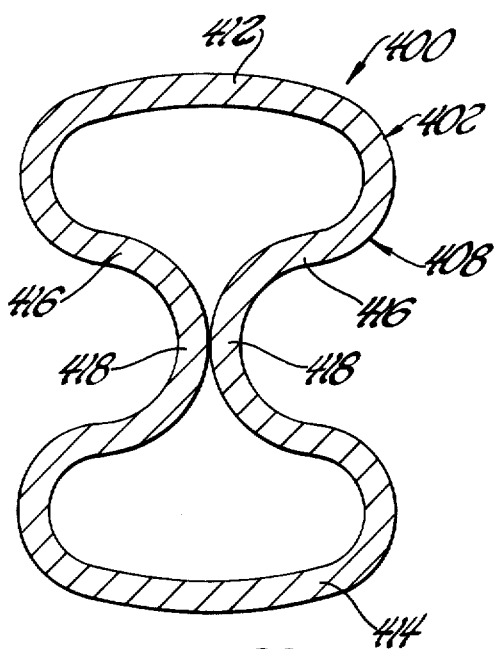
FIG. 28 is a cross sectional view of the axle taken along line 28—28 of FIG. 26 at an I-beam section of the intermediate axle portion.
Figure 29:
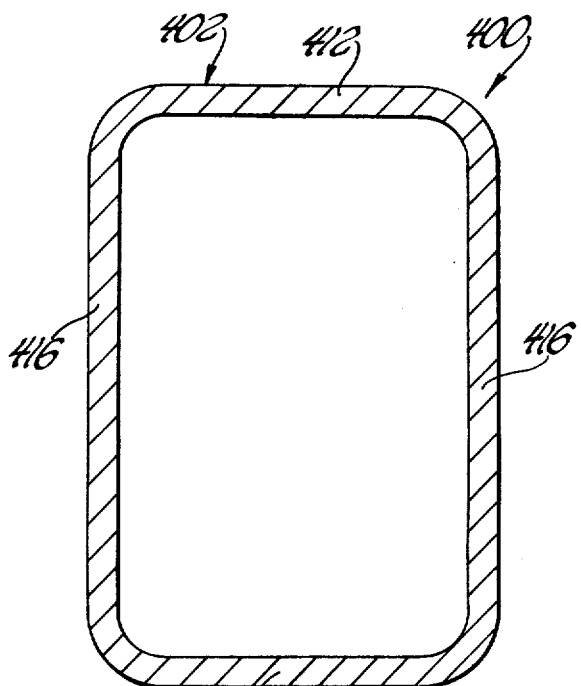
FIGS. 29 and 30 are cross sectional views of the axle respectively taken along lines 29—29 and 30—30 of FIG. 26 at two spaced locations along a rectangular section of the axle.
Figure 30:
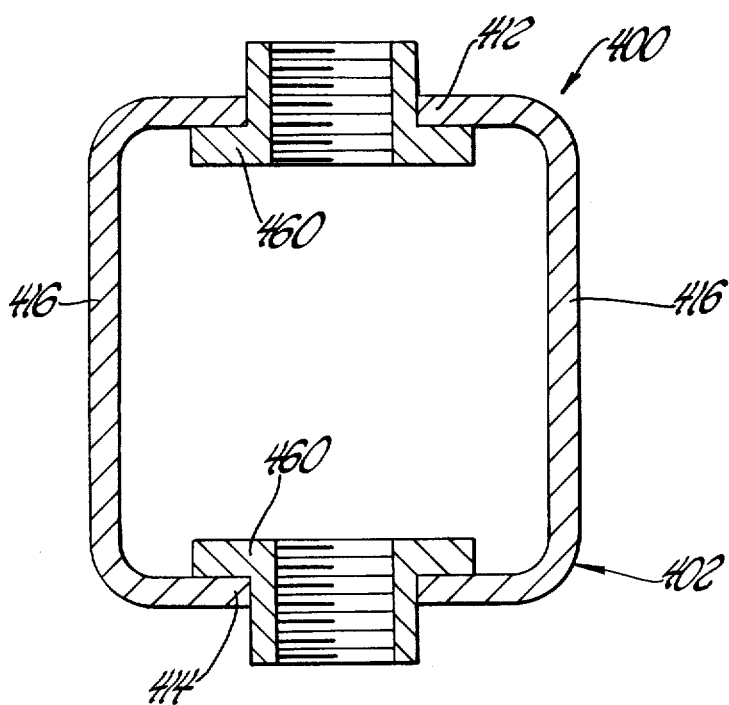

With additional reference to FIGS. 28-30, the intermediate axle portion 402 has horizontally extending upper and lower walls 412 and 414 as well as vertically extending side walls 416 that connect the side walls, all of these walls having a uniform thickness. Die forming of a blank from which the axle is made in a manner similar to that previously described forms the intermediate axle portion to a rectangular shape and subsequent die forming of the side walls 416 forms engaged inward deformations 418 as shown in FIG. 28. These deformations decrease the combined height and width of the axle I-beam section 408 as compared to the combined height and width of the axle at its rectangular section 410. This construction enables the axle to be utilized with vehicles having particular underbody constructions without interference between the axle I-beam section and the vehicle during axle movement and while still having the required size of the rectangular axle section necessary to support the associated wheel by the axle end 406.

As seen in FIGS. 26 and 27, the first axle end 404 has side walls 420 that form continuations of the intermediate axle portion side walls and an upper wall 422 that forms a continuation of the upper intermediate axle portion wall 412. A cut-out section 424 at the lower side of the axle end forms the axle with a downwardly opening U shape. Openings 426 in the side walls 420 provide for mounting of the axle by a suitable bushed pintle pin on the vehicle.

Wheel supporting axle end 406 shown in FIGS. 26 and 27 includes upper and lower projections 428 and 430 for supporting a wheel spindle by ball joints generally in the same manner as the axle end shown and described in connection with FIG. 5. Upper projection 428 has a vertically bent support section 432 that extends upwardly and an end section 434 that extends from the support section. Likewise, the lower projection 430 has a vertically bent support section 436 that extends downwardly and an end section 438 that projects from its support section in a generally parallel relationship to the end section 434 of the upper projection. Webbed side walls 440 extend between the upper and lower projections and are axially upset so as to have a wall thickness at least as great as the uniform wall thickness of the intermediate axle portion 402. Mounting holes 442 in the projection end sections have ball joint mounting links welded adjacent thereto so as to cooperate therewith in positioning ball joints on the axle end.

With reference to FIG. 27, the rectangular section 410 of the intermediate axle portion has a pair of abrupt horizontal bends 448 and 450 of opposite curvature. At the bend 448 closest to the wheel supporting axle end 406, an aperture 452 is formed in the side wall 416 to receive a drive shaft 454 that is driven by a schematically indicated differential 456. A reduced diameter outer portion 458 of the drive shaft extends outwardly through the rectangular section to the supported wheel in order to drive it through an unshown universal joint. In this regard, it should be noted that the rectangular section 410 is provided with flanged inserts 460 (FIG. 30) that are threaded to permit securement of the axle to a spring dampened arm that controls suspension jounce. The axle portion 458 thus extends between these two inserts for driving connection to the wheel.

As seen in FIG. 26, the rectangular section 410 of the intermediate axle portion also has relatively abrupt vertical bends 462 and 464 of opposite curvature. As such, the I-beam axle section 408 is located at a somewhat lower elevation than the rectangular section 410. The vertical mounted axle end 404 is bent somewhat upwardly from the I-beam section 408 such that a somewhat shallow U shape is formed at the left half of the axle to facilitate its mounting with particular vehicle underbody constructions.

It should be understood that the bent axle construction shown in FIGS. 26 and 27 is utilized with a symmetrical bent axle of the opposite hand for supporting the front wheel on the other side of the vehicle with a suitable drive shaft also driving this wheel from the differential 456 shown in FIG. 27.

While preferred embodiments of the axle have herein been described in detail, those familiar with this art will recognize various alternative designs for practicing the present invention as defined by the following claims.

What is claimed is:

1. A unitary axle of an elongated tubular construction having an intermediate portion as well as a first end for mounting the axle on a vehicle and a second end for supporting a wheel; the intermediate portion of the axle having vertically extending side walls as well as horizontally extending upper and lower walls connecting the side walls; said walls of the intermediate axle portion being of a substantially uniform thickness; the intermediate axle portion side walls having inward deformations forming an I-beam section at a location spaced toward the first axle end from the second axle end so that the axle has a combined height along its inwardly deformed side walls and a width along its upper and lower walls that is less than the combined height and width of the axle adjacent the second axle end; the second axle end having an endways opening configuration and including upper and lower walls that project outwardly endways from the intermediate axle portion to define a bifurcated shape; mounting openings in the outwardly projecting upper and lower walls of the second axle end; the second axle end including side walls extending between the upper and lower walls thereof; and each side wall of the second axle end having a greater thickness than the wall thickness of the intermediate axle portion.

2. An axle as in claim 1 wherein the inward deformations of the side walls have inner sides that engage each other.

3. An axle as in claim 1 which has first and second bends generally adjacent the first and second axle ends such that the axle has a somewhat S shape which enables the axle to be used in an overlapping relationship with another bent axle.

4. An axle as in claim 1 wherein the first end of the axle has side walls forming continuations of the intermediate axle portion side walls and including respective mounting openings.

5. An axle as in claim 4 wherein one of the outwardly projecting walls of the second axle end includes a vertically bent support section and an end section projecting from the support section.

6. An axle as in claim 4 wherein the upper wall of the second axle end includes an upwardly bent support section and an end section that projects from the support section.

7. An axle as in claim 4 wherein the intermediate axle portion includes a generally rectangular section adjacent the second end of the axle formed by the upper, lower, and side walls of the intermediate axle portion.

8. A unitary axle of an elongated tubular construction having an intermediate portion as well as a first end for mounting the axle on a vehicle and a second end for supporting a wheel; said intermediate axle portion having first and second bends generally adjacent the first and second axle ends such that the axle has a somewhat S shape which enables the axle to be used in an overlapping relationship with another bent axle; the intermediate axle portion having vertically extending side walls as well as horizontally extending upper and lower walls connecting the side walls; said walls of the intermediate axle portion being of a substantially uniform thickness; a generally rectangular section formed by the upper, lower, and side walls of the intermediate axle portion adjacent the second end of the axle; inward deformations in the side walls forming an I-beam section at a location spaced toward the first axle end from the rectangular section; the combined height along the side walls and width along the upper and lower walls being less for the I-beam section than for the rectangular section due to the inward side wall deformations; the second axle end including upper and lower projections defining a bifurcated shape and having respective upper and lower walls with mounting openings; the upper projection having an upwardly bent support section and an end section that projects from the support section; webbed side walls extending between the upper and lower projections and having a thickness at least as great as the walls of the intermediate axle portion; and the webbed side walls having smoothly curved edges spaced farther from each other than the side walls of the intermediate axle portion.

9. A unitary axle of an elongated tubular construction having an intermediate portion as well as a first end for mounting the axle on a vehicle and a second end for supporting a wheel; said intermediate axle portion having first and second bends generally adjacent the first and second axle ends such that the axle has a somewhat S shape which enables the axle to be used in an overlapping relationship with another bent axle; the intermediate axle portion having vertically extending side walls as well as horizontally extending upper and lower walls connecting the side walls; said walls of the intermediate axle portion being of a substantially uniform thickness; a generally rectangular section formed by the upper, lower, and side walls of the intermediate axle portion adjacent the second end of the axle; inward deformations in the side walls forming an I-beam section at a location spaced toward the first axle end from the rectangular section; the combined height along the side walls and width along the upper and lower walls being less for the I-beam section than for the rectangular section due to the inward side wall deformations; the second axle end including upper and lower projections defining a bifurcated shape and having respective upper and lower walls with mounting openings; the upper projection having an upwardly bent support section and an end section that projects from the support section; webbed side walls extending between the upper and lower projections and having a thickness at least as great as the walls of the intermediate axle portion; said webbed side walls having smoothly curved edges spaced farther from each other than the side walls of the intermediate axle portion; and upper and lower ball joints respectively mounted on the upper and lower walls of the projections within the mounting openings thereof so as to be cooperable for mounting a wheel spindle on the axle.

10. A unitary axle of an elongated tubular construction having an intermediate portion as well as a first end for mounting the axle on a vehicle and a second end for supporting a wheel; said intermediate axle portion having first and second bends generally adjacent the first and second axle ends such that the axle has a somewhat S shape which enables the axle to be used in an overlapping relationship with another bent axle; the intermediate axle portion having vertically extending side walls as well as horizontally extending upper and lower walls connecting the side walls; said walls of the intermediate axle portion being of a substantially uniform thickness; a generally rectangular section formed by the upper, lower, and said walls of the intermediate axle portion adjacent the second end of the axle; inward deformations in the side walls forming an I-beam section at a location spaced toward the first axle end from the rectangular section; the combined height along the side walls and width along the upper and lower walls being less for the I-beam section than for the rectangular section due to the inward side wall deformations; the second axle end having an endways opening configuration and including upper, lower, and side walls with a greater wall thickness than the walls of the intermediate axle portion; said walls of the second axle end forming a rectangular shape; and the upper and lower walls of the second axle end projecting outwardly endways from the intermediate axle portion and having respective mounting openings.

11. A unitary axle of an elongated tubular construction having an intermediate portion as well as a first end for mounting the axle on a vehicle and a second end for supporting a wheel; said intermediate axle portion having first and second bends generally adjacent the first and second axle ends such that the axle has a somewhat S shape which enables the axle to be used in an overlapping relationship with another bent axle; the intermediate axle portion having vertically extending side walls as well as horizontally extending upper and lower walls connecting the side walls; said walls of the intermediate axle portion being of a substantially uniform thickness; a generally rectangular section formed by the upper, lower, and side walls of the intermediate axle portion adjacent the second end of the axle; inward deformations in the side walls forming an I-beam section at a location spaced toward the first axle end from the rectangular section; the combined height along the side walls and width along the upper and lower walls being less for the I-beam section than for the rectangular section due to the inward side wall deformations; the second axle end having an endways opening configuration and including upper, lower, and side walls with a greater wall thickness than the walls of the intermediate axle portion; said walls of the second axle end forming a rectangular shape; the upper and lower walls of the second axle end projecting outwardly endways from the intermediate axle portion and having respective mounting openings; and a king pin mounted within the upper and lower mounting openings for supporting a wheel spindle.

12. A unitary axle of an elongated tubular construction having an intermediate portion and an end for supporting a wheel; the intermediate axle portion having vertically extending side walls as well as horizontally extending upper and lower walls connecting the side walls; said walls of the intermediate axle portion being of a substantially uniform thickness; the end of the axle having an endways opening configuration and including upper and lower projections defining a bifurcated shape; the upper and lower projections having respective upper and lower walls forming continuations of the upper and lower walls of the intermediate axle portion; one of the projections having a support section bent vertically from the intermediate axle portion and an end section projecting from the support section; webbed side walls extending between the upper and lower projections and having a thickness at least as great as the intermediate axle portion wall thickness; said webbed side walls having edges that extend between the upper and lower walls and partially define the endways opening configuration of the axle end; and the edges of the webbed side walls having smoothly curved shapes and being spaced farther from each other than the side walls of the intermediate axle portion.

13. An axle as in claim 12 wherein the upper projection includes the support section which is bent upwardly from the intermediate axle portion.

14. An axle as in claim 12 wherein the intermediate axle portion has generally straight upper, lower, and side walls forming a rectangular section adjacent the second end of the axle.

15. An axle as in claim 12 wherein the webbed side walls are thicker than the intermediate axle portion walls.

16. A unitary axle of an elongated tubular construction having an intermediate portion and an end for supporting a wheel; the intermediate axle portion including a rectangular section having vertically extending side walls as well as horizontally extending upper and lower walls connecting the side walls adjacent the axle end; said walls of the intermediate axle portion being of a substantially uniform thickness; the end of the axle having an endways opening configuration and including upper and lower projections defining a bifurcated shape; the upper and lower projections having respective upper and lower walls forming continuations of the upper and lower walls of the intermediate axle portion; the upper projection having an upwardly bent support section and an end section projecting from the support section; webbed side walls extending between the upper and lower projections and having a thickness at least as great as the intermediate axle portion wall thickness; said webbed side walls having edges of smoothly curved shapes that extend between the upper and lower walls and partially define the endways opening configuration of the axle end; and the edges of the webbed side walls being spaced farther from each other than the side walls of the intermediate axle portion.

17. A unitary axle of an elongated tubular construction having an intermediate portion and an end for supporting a wheel; the intermediate axle portion having vertically extending side walls as well as horizontally extending upper and lower walls connecting the side walls; said walls of the intermediate axle portion being of a substantially uniform thickness; the end of the axle having an endways opening configuration and including upper and lower projections defining a bifurcated shape; the upper and lower projections having respective upper and lower walls forming continuations of the upper and lower walls of the intermediate axle portion; the upper projection having a support section bent vertically from the intermediate axle portion and an end section projecting from the support section; each projection wall having a mounting opening therein; webbed side walls extending between the upper and lower projections and having a thickness at least as great as the intermediate axle portion wall thickness; said webbed side walls having smoothly curved edges that extend between the upper and lower walls and partially define the endways opening configuration of the axle end; the edges of the webbed side walls being spaced farther from each other than the side walls of the intermediate axle portion; and upper and lower ball joints respectively mounted within the upper and lower projection mounting openings for supporting a wheel spindle.

18. A unitary axle of an elongated tubular construction having an intermediate portion and an end for supporting a wheel; the intermediate axle portion having vertically extending side walls as well as horizontally extending upper and lower walls connecting the side walls; said walls of the intermediate axle portion being of a substantially uniform thickness; the end of the axle including upper and lower projections defining a bifurcated shape and having respective upper and lower walls forming continuations of the upper and lower walls of the intermediate axle portion; the upper projection having an upwardly bent support section and an end section projecting from the support section; and webbed side walls extending between the upper and lower projections with a thickness greater than the intermediate axle portion wall thickness and having smoothly curved edges spaced farther from each other than the side walls of the intermediate axle portion.

19. A unitary axle of an elongated tubular construction having an intermediate portion and an end for supporting a wheel; the intermediate axle portion having vertically extending side walls as well as horizontally extending upper and lower walls connecting the side walls; said walls of the intermediate axle portion being of a substantially uniform thickness; the end of the axle including upper and lower projections defining a bifurcated shape and having respective upper and lower walls forming continuations of the upper and lower walls of the intermediate axle portion; the upper projections having an upwardly bent support section and an end section projecting from the support section; the lower projection having a downwardly bent support section and an end section extending from the support section thereof parallel to the end section of the upper projection; and webbed side walls extending between the upper and lower projections with a thickness at least as great as the intermediate axle portion wall thickness and having smoothly curved edges spaced farther from each other than the side walls of the intermediate axle portion.

20. A unitary axle of an elongated tubular construction having an intermediate portion and an end for supporting a wheel; the intermediate axle portion having vertically extending side walls as well as horizontally extending upper and lower walls connecting the side walls; said walls of the intermediate axle portion being of a substantially uniform thickness; the end of the axle including upper and lower projections defining a bifurcated shape and having respective upper and lower walls forming continuations of the upper and lower walls of the intermediate axle portion; the upper projection having an upwardly bent support section and an end section projecting from the support section; the lower projection having a downwardly bent support section and an end section extending from the support section thereof parallel to the end section of the upper projection; and webbed side walls extending between the upper and lower projections with a thickness greater than the intermediate axle portion wall thickness and having smoothly curved edges spaced farther from each other than the side walls of the intermediate axle portion.

21. A unitary axle of an elongated tubular construction having an intermediate portion as well as a first end for mounting the axle on a vehicle and a second end for supporting a wheel; the second axle end having upper and lower projections and webbed side walls extending therebetween is a spaced relationship to cooperate in defining an endways opening configuration; the webbed side walls having edges of smoothly curved shapes; the intermediate portion of the axle having vertically extending side walls as well as horizontally extending upper and lower walls connecting the side walls; said walls of the intermediate axle portion being of a substantially uniform thickness; a rectangular section along the intermediate axle portion defined by the upper, lower, and side walls thereof immediately adjacent the wheel supporting axle end; the edges on the webbed side walls of the second axle end being spaced farther from each other than the side walls of the rectangular section along the intermdiate axle portion; the intermediate axle portion side walls having inward deformations forming an I-beam section immediately adjacent the rectangular section spaced from the second axle end; said inward deformation providing the I-beam section with a combined height along its side walls and width along its upper and lower walls that is less than the combined height and width of the axle at the rectangular section; and a pair of abrupt horizontal bends of opposite curvature in the intermediate axle portion.

22. A front wheel drive unitary axle of an elongated tubular construction having an intermediate portion as well as a first end for mounting the axle on a vehicle and a second end for supporting a wheel; the second wheel end including upper and lower projections and webbed side walls extending between the projections with a thickness at least as great as the walls of the intermediate axle portion; the intermediate portion of the axle having vertically extending side walls as well as horizontally extending upper and lower walls connecting the side walls; said walls of the intermediate axle portion being of a substantially uniform thickness; a rectangular section along the intermediate axle portion defined by the upper, lower and side walls thereof immediately adjacent the wheel supporting axle end; the intermediate axle portion side walls having inward deformations forming an I-beam section immediately adjacent the rectangular section spaced from the second axle end; said inward deformations providing the I-beam section with a combined height along its side walls and width along its upper and lower walls that is less than the combined height and width of the axle at the rectangular section; a pair of abrupt horizontal bends of opposite curvature in the intermediate axle portion; and an aperture in the bend closest to the wheel supporting axle end for receiving a drive shaft that drives the wheel.

23. A front wheel drive unitary axle of an elongated tubular construction having an intermediate portion as well as a first end for mounting the axle on a vehicle and a second end for supporting a wheel; the second wheel end including upper and lower projections; at least one of the projections having a vertically bent support section and an end section extending from the support section; webbed side walls extending between the projections with a thickness at least as great as the walls of the intermediate axle portion; the intermediate portion of the axle having vertically extending side walls as well as horizontally extending upper and lower walls connecting the side walls; said walls of the intermediate axle portion being of a substantially uniform thickness; a rectangular section along the intermediate axle portion defined by the upper, lower, and side walls thereof immediately adjacent the wheel supporting axle end; the intermediate axle portion side walls having inward deformations forming an I-beam section immediately adjacent the rectangular section spaced from the second wheel end; said inward deformations providing the I-beam section with a combined height along its side walls and width along its upper and lower walls that is less than the combined height and width of the axle at the rectangular section; a pair of abrupt horizontal bends of opposite curvature in the rectangular section; and an aperture in the axle at the bend closest to the wheel supporting axle end for receiving a drive shaft that drives the wheel.

24. A front wheel drive unitary axle of an elongated tubular construction having an intermediate portion as well as a first end for mounting the axle on a vehicle and a second end for supporting a wheel; the second wheel end including upper and lower projections; each projection including a vertically bent support section and an end section extending from the support section; webbed side walls extending between the projections with a thickness at least as great as the walls of the intermediate axle portion; the intermediate portion of the axle having vertically extending side walls as well as horizontally extending upper and lower walls connecting the side walls; said walls of the intermediate axle portion being of a substantially uniform thickness; a rectangular section along the intermediate axle portion defined by the upper, lower, and side walls thereof immediately adjacent the wheel supporting axle end; the intermediate axle portion side walls having inward deformations forming an I-beam section immediately adjacent the rectangular section spaced from the second wheel end; said inward deformations providing the I-beam section with a combined height along its side walls and width along its upper and lower walls that is less than the combined height and width of the axle at the rectangular section; a pair of abrupt horizontal bends of opposite curvature in the rectangular section; an aperture in the rectangular section at the horizontal bend closest to the wheel supporting axle end for receiving a drive shaft that drives the wheel; and a pair of abrupt vertical bends of opposite curvature in the rectangular section of the axle.

* * * * *